United States Patent [19]

McNinch, Jr. et al.

[11] 4,168,866
[45] Sep. 25, 1979

[54] ANTI-WHEEL LOCK SYSTEM

[75] Inventors: Joseph H. McNinch, Jr., Livonia; Daniel G. Smedley, Dearborn Heights; David T. Klein, Southfield, all of Mich.

[73] Assignee: Eaton Corporation, Cleveland, Ohio

[21] Appl. No.: 831,908

[22] Filed: Sep. 9, 1977

[51] Int. Cl.² .............................................. B60T 8/02
[52] U.S. Cl. ...................................... 303/106; 303/92
[58] Field of Search ............. 188/181; 303/20, 91–93, 303/97, 105, 106, 109; 307/233; 361/238; 324/78 J, 162, 166; 328/133, 140; 333/294, 303; 340/52 B, 53, 62

[56] References Cited

U.S. PATENT DOCUMENTS

| | | | |
|---|---|---|---|
| 3,473,048 | 10/1969 | Winn | 307/233 R |
| 3,511,542 | 5/1970 | Fielek, Jr. | 303/97 |
| 3,578,819 | 5/1971 | Atkins | 303/20 UX |
| 3,602,554 | 8/1971 | Ichimura et al. | 303/92 |
| 3,606,491 | 9/1971 | Walsh | 303/20 UX |
| 3,608,979 | 9/1971 | Coyle | 303/92 X |
| 3,680,923 | 8/1972 | Peterson et al. | 303/92 |
| 3,702,407 | 11/1972 | Sharp | 307/233 B |
| 3,768,872 | 10/1973 | Urban et al. | 303/20 X |
| 3,803,425 | 4/1974 | Carp | 303/92 X |
| 3,929,382 | 12/1975 | McNinch, Jr. et al. | 303/106 |
| 3,955,854 | 5/1976 | Marouby | 303/109 |
| 3,964,796 | 6/1976 | Bremer | 303/92 X |
| 3,966,267 | 6/1976 | McNinch, Jr. et al. | 303/106 |
| 4,018,486 | 4/1977 | Sutton | 303/92 X |
| 4,035,032 | 7/1977 | Bertolasi | 303/109 |

FOREIGN PATENT DOCUMENTS

2053834  5/1971  Fed. Rep. of Germany ........... 303/109

Primary Examiner—Stephen G. Kunin
Attorney, Agent, or Firm—Blanchard, Flynn, Thiel, Boutell & Tanis

[57] ABSTRACT

A wheel lock control system for use with a vehicle having at least first and second spaced apart, independently rotatable wheels and having a braking system for applying braking forces to such wheels. A brake control responds to an applied lock signal for controlling the braking system to relieve the braking forces on the wheels. Input circuitry including nonlinear frequency to voltage convertors provides first and second wheel speed signals of values nonlinearly representative of the wheel speeds of the first and second wheels, respectively, such that for a given change in wheel speed there is a greater change in wheel speed signal at low wheel speeds than at high wheel speeds. Logic circuitry includes linear comparator circuitry responsive to the nonlinear first and second wheel speed signals for producing the aforementioned lock signal. The frequency to voltage converter operation is monitored, such that fault monitor circuitry disables the lock signal responsive circuitry when the higher of the first and second wheel speed signals rises beyond a preselected limit. The logic circuitry incorporates portions providing a lock signal.

9 Claims, 7 Drawing Figures

FIG. 6

ANTI-WHEEL LOCK SYSTEM

FIELD OF THE INVENTION

This invention relates to the art of wheel lock control systems for controlling braking forces applied to the wheels of a vehicle having a braking system, and more particularly, to a lock control system for use with a vehicle having a pair of spaced apart, independently rotatable wheels.

BACKGROUND OF THE INVENTION

The present application is directed toward improvements in anti-lock systems such as those described in U.S. Pat. Nos. 3,966,267 and 3,929,382, assigned to the assignee of the present invention.

In general, prior wheel lock control systems, such as those immediately above-referenced, have provided a lock signal, for releasing the braking forces on the wheels of the vehicle, under particular wheel operating conditions, all for the basic purpose of systems of this general type, namely minimization of wheel locking due to braking.

In general, a system of the kind aforementioned has provided deceleration detection circuitry for sensing when the speed of a braked wheel decreases at a rate substantially faster than obtainable by a vehicle, indicating an impending wheel lock condition, for releasing the braking force until such wheel deceleration ends and thereafter permitting braking force to be restored to continue slowing the vehicle.

The aforementioned apparatus also includes fixed bleed circuitry for providing a skid signal when the average wheel speed of the two wheels being monitored decreases below a declining reference signal representative of a desired rate of decline in the speed of the faster wheel. This circuit is useful under light load and/or low coefficient friction conditions, wherein a wheel may lock very rapidly, before the deceleration logic lock signal has had an opportunity to exhaust the brakes sufficiently to allow the wheels to spin up toward vehicle speed. Once the wheel has stopped in the locked condition, it is of course no longer decelerating and thus no longer causing the deceleration logic to provide a lock signal. The fixed bleed logic overcomes this problem by furnishing its own lock signal well before the rapidly decelerating wheel locks, signaling the brakes to keep exhausting. The fixed bleed circuit terminates its lock signal when such wheel has spun up to a speed corresponding to a desired fraction of the vehicle speed, as the latter is simulated by a portion of the fixed bleed circuitry.

The aforementioned prior lock control systems also provide differential wheel speed logic to produce a lock signal where speeds of the two wheels being monitored substantially differ as may result, for example, from a split coefficient of friction between the road surface and each of the two wheels. When the wheel speed difference becomes too great it is desirable to release the brake forces to prevent lockup of the lower speed wheel.

The aforementioned prior systems, and predecessors thereto, have in some instances included additional functions. For example, the system of aforementioned U.S. Pat. No. 3,929,382 incorporated delay circuitry to delay the application of signals from one of the circuits above-mentioned to the braking system, as well as acceleration circuitry responsive to spin up acceleration of a wheel following the initiation of brake release. One of the aforementioned systems has provided for monitoring of some circuits therein and for blocking of a lock signal should a monitored circuit develop a specific fault.

Systems constructed in accord with aforementioned U.S. Pat. Nos. 3,929,382 and 3,966,267 have enjoyed commercial success and have been generally satisfactory. However, a continuing effort to perfect systems of this kind has led to the present invention.

Accordingly the objects of this invention include provision of:

A lock control system capable of performing substantially the functions aforementioned with simplified circuitry and being capable of performing additional functions with little additional circuitry or complication.

A system, as aforementioned, in which wheel speed signals applied to deceleration detection, fixed bleed, and other circuitry within the system are related nonlinearly to the speeds of the respective wheels represented thereby, and in which deceleration, fixed bleed, etc. circuitry can accordingly be simplified and made substantially linear in operation, despite the need in such circuits to produce lock signals in nonlinear relation to actual wheel speed, to compensate for the greater MPH change at high speeds than at low speeds resulting from the requirement for a certain constant percentage of slippage at both low and high wheel speeds.

A system, as aforesaid, incorporating nonlinear frequency to voltage convertors to provide nonlinear wheel speed signals.

A system, as aforesaid, including improved deceleration detector and fixed bleed circuitry of simplified and linearized arrangement, including, in the fixed bleed portion, feedback of lock signals to control the input into the fixed bleed circuitry.

A system, as aforesaid, which provides for monitoring of operation of the wheel speed signal generating circuitry, particularly to protect against erroneously high wheel speed signals and which is capable of overruling lock signals under such a fault condition.

A system, as aforesaid, which in one embodiment additionally provides for monitoring of valve driver circuitry disposed between the lock signal generating circuitry and the braking system, particularly for monitoring correspondence of inputs to outputs in such valve driver or circuitry.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a wheel lock control system for use with a vehicle having at least first and second spaced apart, independently rotatable wheels and having a braking system for applying braking forces to such wheels. A brake control responds to an applied lock signal for controlling the braking system to relieve the braking forces on the wheels. Input circuitry including nonlinear frequency to voltage convertors provide first and second wheel speed signals of values nonlinearly representative of the wheel speeds of the first and second wheels, respectively, such that for a given change in wheel speed there is a greater change in voltage at low wheel speeds than at high wheel speeds. Logic circuitry includes linear comparator circuitry responsive to the nonlinear first and second wheel speed signals for producing the aforementioned lock signal. The frequency to voltage convertor operation is monitored, such that fault monitor circuitry disables the lock signal responsive circuitry when the higher of the first and second wheel speed signals rises beyond a preselected limit. The logic circuitry incorporates portions providing a lock signal.

DETAILED DESCRIPTION

Figure 1:
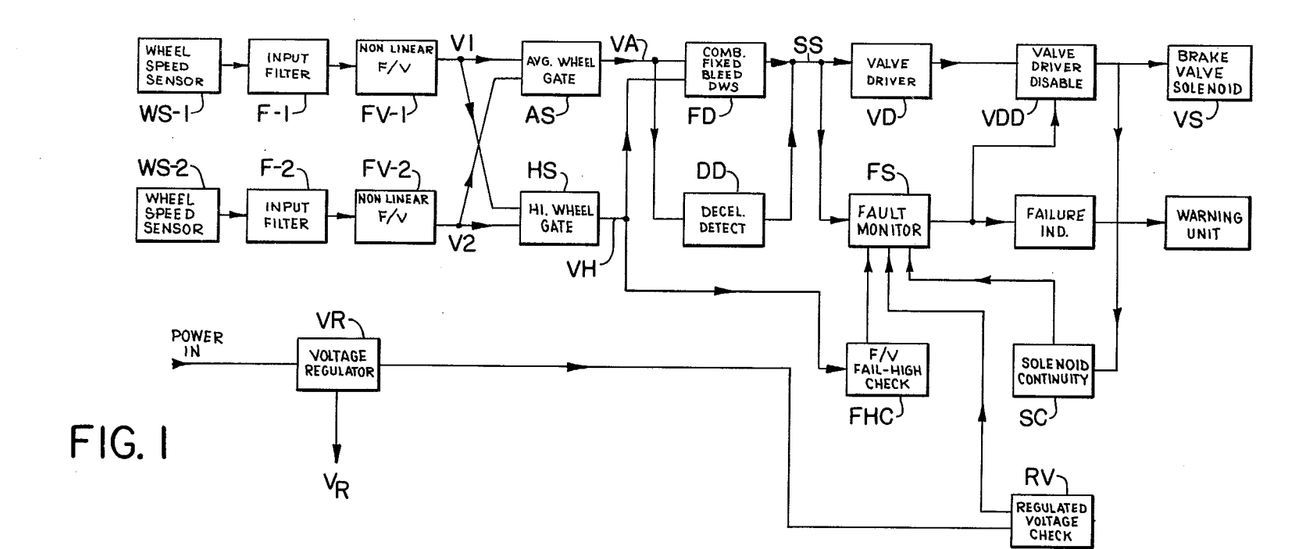
FIG. 1 is a block diagram of a basic form of the anti-wheel lock system embodying the invention.

Referring now to FIG. 1, wheel speed sensors WS-1 and WS-2 respectively sense the wheel speeds of the two wheels (normally independently rotatable on the same axle) to be controlled. In the preferred embodiment, each wheel speed sensor comprises a tachometer generator, or the like, capable of developing an alternating signal having a frequency proportional to wheel speed. The frequency signals from the wheel speed sensors pass through respective input filters F1 and F2, respectively, to nonlinear frequency to voltage convertors FV1 and FV2 respectively, for developing respective DC signals of amplitude nonlinearly proportioned to the frequency of the applied frequency signals and correspondingly related to the axial speeds of the corresponding first and second wheels. The resulting wheel velocity signals V1 and V2, from convertors FV1 and FV2, are both applied to an average wheel gate AS which provides an output voltage VA proportional to the average of the nonlinear velocity signals V1 and V2, and to a high wheel gate HS having an output voltage amplitude VH proportional to the larger of the nonlinear velocity signals V1 and V2. Accordingly, the signals VA and VH are nonlinear representations of the average speed of the first and second wheels being monitored, and the speed of the higher speed one of such wheels, respectively.

Wheel lock signals, by which the vehicle braking system for the aforementioned first and second wheels is disabled, are produced by a deceleration detection circuit DD and a combination fixed bleed - DWS circuit FD. The decel detector circuit DD operates primarily in response to the average velocity signal VA as indicated by FIG. 1, though as will be discussed hereafter with respect to FIG. 2 more satisfactory system operation comes from slightly tempering the average speed signal VA with the high speed signal VH. The combination fixed bleed - DWS circuit FD on the other hand operates in response to both such velocity signals VA and VH. A lock signal SS produced by either of these circuits DD and FD is applied to a valve driver VD. The valve driver VD normally responds to such a lock signal SS by triggering a brake valve solenoid VS for initiating deactuation of the braking system for the aforementioned first and second wheels. When the lock signal SS terminates, the solenoid VS becomes disabled, which initiates return of the braking system to its normal operating condition. The solenoid VS in its manner of interconnection to the braking system may be of any conventional type, for example as employed with the systems disclosed in the aforementioned U.S. patents.

The circuitry above-discussed is monitored by a fault monitor circuit FS to guard against improper disabling of the braking system, through activation of solenoid VS due to improper operation of parts of the circuitry above-discussed. Accordingly, the monitor circuit FS receives inputs from a solenoid continuity check circuit SC, coupled to the valve solenoid VS, and from a regulated voltage check circuit RV responsive to the output of a conventional voltage regulator VR, of any convenient circuitry, used to supply operating potential to the various circuits of FIG. 1. Lock signals SS are also applied to the monitor circuit FS. Given an input signal indicating improper operation of one of the circuits above-discussed, monitor circuit FS actuates a failure indication-warning unit, to warn the vehicle driver of the problem and also signals a valve driver disable circuit VDD, interposed between the valve driver VD and brake valve solenoid VS to block further actuation of the solenoid and thus block further interference with the braking system. Such returns the brake system to normal operation, without the benefit of the anti-lock system. The failure indicator and warning unit may be of conventional content, as of the type employed with the aforementioned patents. In addition, the monitor circuit FS also receives an input from a F/V failhigh check circuit FHC which in turn monitors the output of the high wheel gate HS to detect malfunctioning thereof as would result in an excessively high value for the nonlinear high wheel speed signal VH.

Figure 2A:
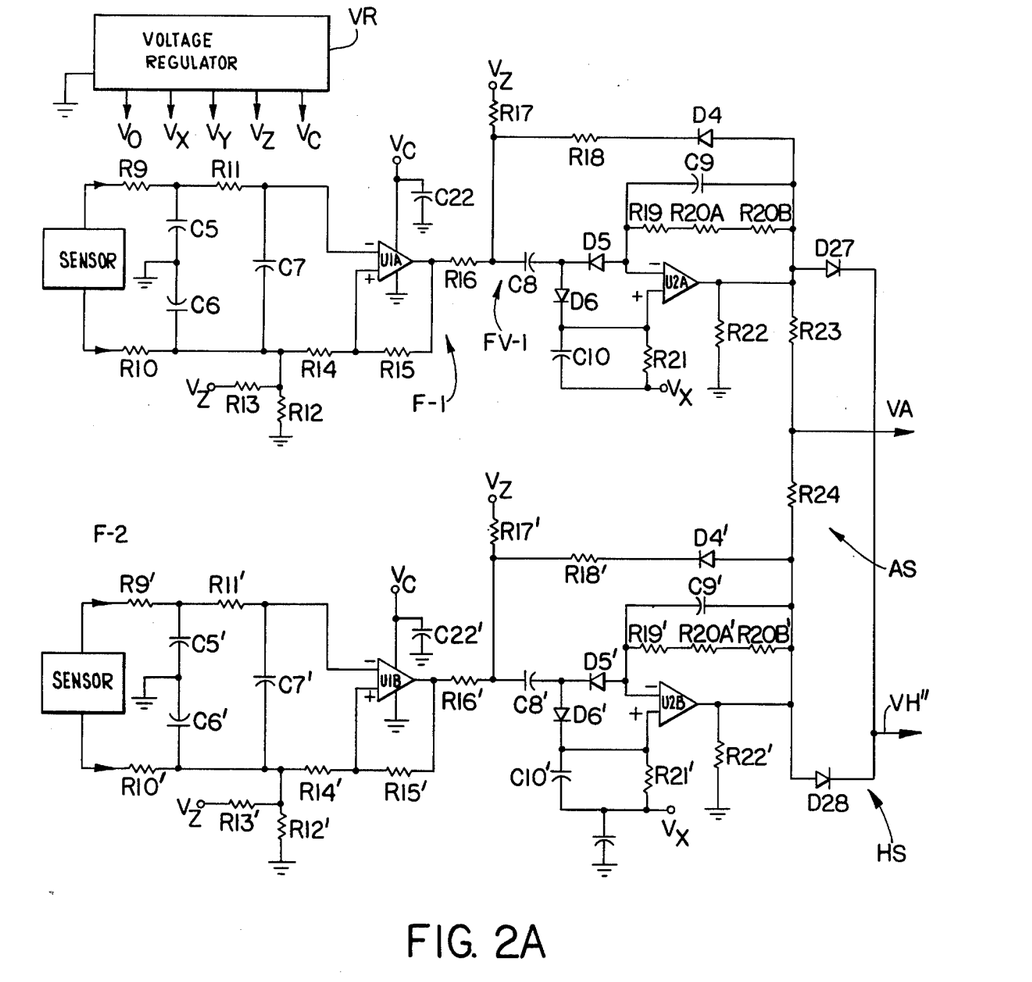
FIGS. 2A and 2B present the FIG. 1 system in schematic form.
Figure 2B:
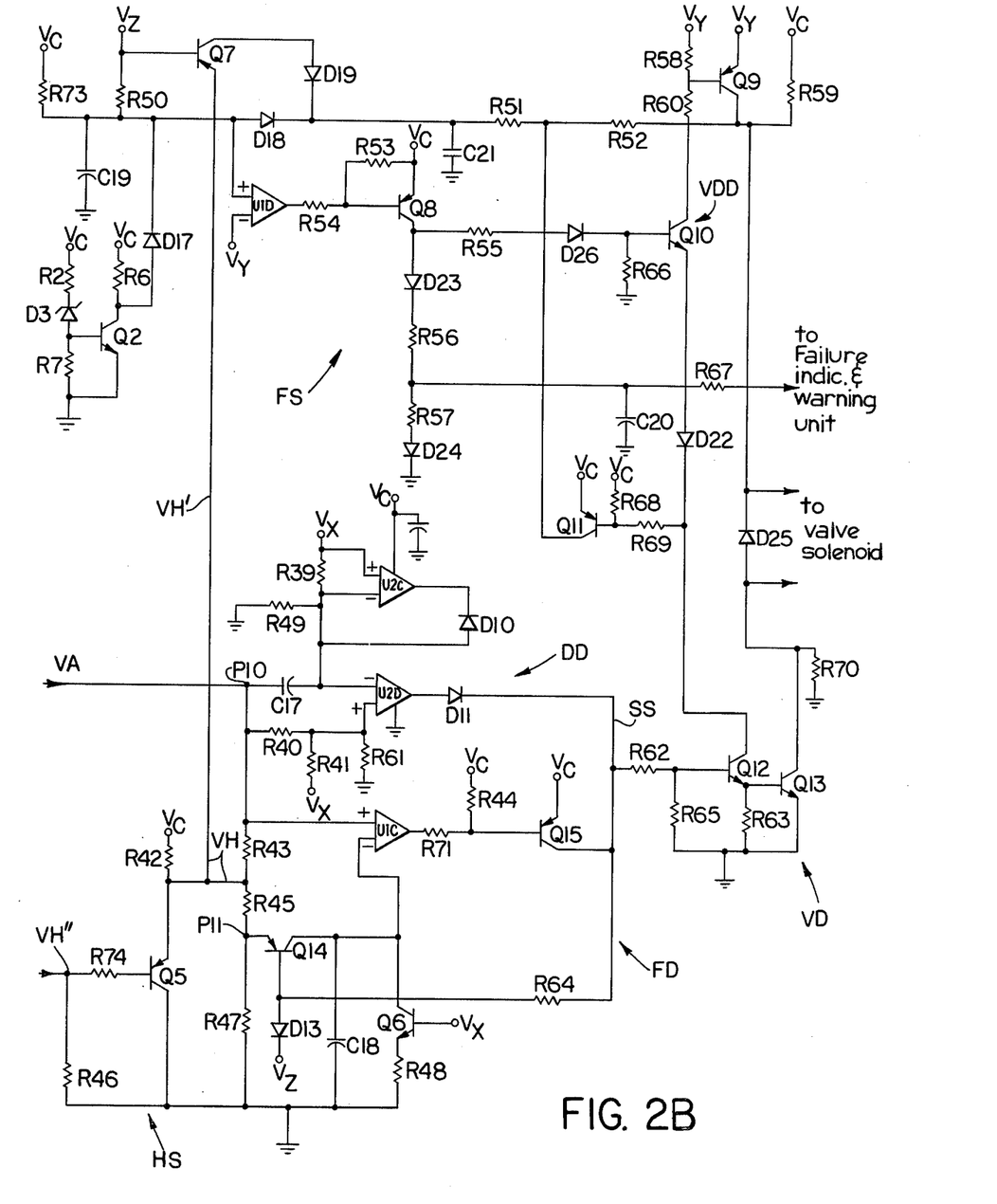
Figure 3:
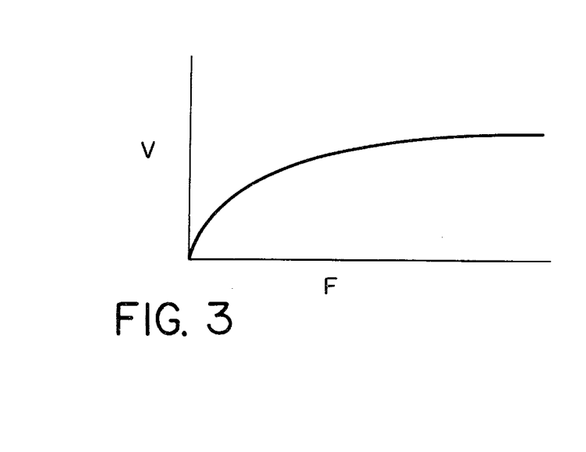
FIG. 3 shows a frequency to voltage curve representing the nonlinear frequency to voltage conversion characteristic of the FIG. 1 system.

With the orientation provided by FIG. 1 in mind, attention is directed to the detailed circuitry of FIGS. 2A and 2B. In FIG. 2A, the frequency output of the wheel speed sensor WS-1, for the first wheel to be monitored, is supplied across the input of the filter F1 defined by resistors R9 and R10. The latter are respectively connected to ground by corresponding capacitors C5 and C6. Resistor R9 and capacitor C5 (and similarly resistor R10 and capacitor C6) form a filter to eliminate high frequency noise (here at about 100 kilohertz and higher). Resistor R11 and capacitor C7, connected in series across capacitors C5 and C6, provide a filter to roll off the amplitude of the frequency signal supplied by sensor WS-1 where, as typical, such sensor output amplitude itself increases as a function of speed. Hence, the roll-off filter R11, C7 provides a filter curve which offsets, or compensates for, this amplitude characteristic of the sensor WS-1 such that the resultant frequency signal appearing across capacitor C7 is of substantially constant amplitude over the working frequency range of the sensor WS-1.

A squaring circuit comprises a comparator U1A, powered as shown from an output $V_c$ of voltage regulator VR, with a shunt filter capacitor C22 to ground. Output $V_c$ is here regulated merely as to its maximum voltage. The positive and negative inputs of comparator U1A connect (the former through a resistor R14) across the capacitor C7. A voltage divider comprising resistors R12 and R13 in series across regulator output $V_Z$ and ground has its intermediate point connected between capacitor C7 and resistor R14, and sets the DC level on the positive input of comparator at a level above ground so that the negative input of the comparator can swing both positively and negatively and still stay within the working range of the comparator. For example, the divider R12 and R13 may set the negative input of the comparator at about 3 volts above ground such that the negative comparator input can swing, for example, from 3.1 volts up to 6.2 volts and down to ground, providing a 6.2 volt swing.

A resistor R15 connects the output of comparator U1A to the positive input thereof. Resistors R14 and R15 provide the comparator U1A with a hysteresis effect, reducing false switching of the comparator due to low amplitude noise. Particularly, because of resistors R14 and R15 a certain minimum voltage swing (for example about 160 millivolts peak to peak) is required across the input of comparator U1A in order to cause same to start switching. This provides a margin of protection against noise because once the comparator switches, the input must drop below the 160 millivolt (for example) level before the comparator will switch in the other direction.

The resultant squarewave frequency signal is then applied to frequency to voltage convertor FV1 at the input resistor R16 of the latter. The frequency to voltage (F/V) convertor comprises an operational amplifier U2A. In the preferred embodiment shown, the frequency to voltage convertor FV1 is a doubleacting convertor which makes use of both the positive and the negative halfwaves of the squarewave frequency signal from comparator U1A. This minimizes ripple in the output of the F/V convertor and provides faster response (approximately twice the response speed) of a single acting F/V convertor. To achieve this double action, integration circuits driven by the frequency signal from comparator U1A are provided at the positive, as well as the negative, input of operational amplifier U2A. Thus, the squarewave frequency signal is applied through resistor R16 and is differentiated by series capacitor C8 to provide alternate positive and negative going spikes which are applied to oppositely oriented steering diodes D6 and D5, in turn connected to the positive and negative inputs of the operational amplifier U2A, and to respective integrating capacitors C10 and C9. Capacitor C10 in turn connects to an output $V_X$ of voltage regulator VR, and is paralleled by a resistor R21. Capacitor C9, on the other hand, is in turn connected to the output of operational amplifier U2A, being paralleled by a resistor R19, as well as series resistors R20A and R20B selected to control the gain of the operational amplifier U2A, i.e. such that at a certain input frequency applied to the F/V convertor there will be a preselected DC amplitude at the output of the convertor, namely at the output of operational amplifier U2A.

A resistor R22 is provided between the output of operational amplifier U2A and ground to act as a load such that the operational amplifier is always sourcing current.

The frequency to voltage convertor FV1 provides a preselected nonlinear relationship between the input frequency signal and the output DC voltage amplitude thereof. More particularly, a diode D4 in series with a resistor R18 connects from the output of operational amplifier U2A to a point between resistor R16 and differentiating capacitor C8. It also connects through a resistor R17 to one of the positive outputs $V_Z$ of the voltage regulator VR. Inasmuch as the output of comparator U2A is here positive, the anode of diode D4 is oriented toward the operational amplifier. Resistors R17, R16 and R18 form, in effect, a voltage divider. In operation, when the output of comparator U1A is low and given a low output amplitude from operational amplifier U2A (indicating a low speed for that wheel), diode D4 will not conduct and there will be no current flow through resistor R18. Accordingly, only resistors R17 and R16 provide the voltage divider to which input capacitor C8 connects. On the other hand, once the output amplitude of operational amplifier U2A starts increasing, diode D4 will start conducting, such that the voltage divider, to which input capacitor C8 is connected, now additionally includes resistor R18, as well as the first resistors R17 and R16. Accordingly, with the squarewave output of comparator U1A at the low voltage end of its swing (e.g. substantially ground potential), voltage applied to the capacitor C8 will be at some minimum value, corresponding to the IR drop across resistor R16 and thus lowest at low wheel speed with only resistor R17 supplying current, but higher at higher wheel speeds with additional current being supplied through then conductive diode D4 and resistor R18 to increase the IR drop across such resistor R16. On the other hand, with the squarewave output voltage of comparator U1A at the high end, comparator U1A has essentially an open collector output and hence an output voltage that comes substantially all the way up to maximum (for example 6.2 volts). There is some loading, but very little, back through the resistor R15, which has a relatively high value, for example 360 k ohms. Accordingly, with the squarewave form output of comparator U1A at the top of its swing, the voltage input to capacitor C8 rises to about this maximum comparator output voltage, here 6.2 volts. Accordingly, the swing of the input voltage to capacitor C8 (from such minimum voltage value to, for example, a 6.2 volt maximum) is larger at low wheel speeds, than at high wheel speeds, providing the mentioned nonlinearity of the frequency to voltage convertor FV1.

Capacitor C8 acts as a differentiator to charge integrator capacitors C9 and C10 on the negative going and positive going swings of the squarewave frequency signal input to comparator U1A. More particularly, capacitor C8 issues discreet pulses, which are related to wheel speed, to the integrator capacitors C9 and C10. The resistors R20A and R20B are selected, as stated, such that a given input frequency will result in a given voltage amplitude across operational amplifier output resistor R22, and except for the nonlinearity introduced by aforementioned diode D4 and its associated circuitry, the F/V convertor voltage output rises proportionally with increased input frequency and hence wheel speed.

Since a pulse from capacitor C8 goes into one or the other of integrating capacitors C9 and C10 every time the squarewave output of caparator U1A switches from high to low or low to high, then the output voltage amplitude of the F/V convertor responds to both half cycles of the input frequency wave form and the aforementioned double-acting characteristic is obtained.

The wheel sensor WS2, filter F2 and frequency to voltage convertor FV2 for the second wheel are preferably identical in content to the corresponding units immediately above-described with respect to the first wheel (and, except for comparator U1B and U2B), parts thereof carry the same reference numerals with a prime (') mark added.

The average wheel gate AS preferably is provided by resistors R23 and R24 connected in series between the outputs of operational amplifiers U2A and U2B of the two F/V convertors with the nonlinear average wheel speed line VA connected between such resistors. The high wheel speed gate HS is conveniently formed by diodes D27 and D28 connected at their anodes to the outputs of the same F/V convertors and thus connected at their cathodes commonly to the nonlinear high wheel voltage line VH", for a positive polarity output.

To better drive succeeding circuitry, the high wheel gate HS preferably additionally includes an emitter follower output transistor Q5 (FIG. 2B), with input resistor R74 connected to the cathodes of the mentioned diodes D27 and D28, a resistor R46 across the base collector junction, a collector connected to ground and emitter connected through emitter resistor R42 to a positive output $V_C$ of the voltage regulator VR. Output of gate HS, is taken from the emitter of transistor Q5 and applied to line VH.

The deceleration detector DD, to oversimplify, basically compares a signal based on the rate of drop of the average wheel speed signal VA to a reference and provides a lock signal while this rate of drop is excessive and hence suggestive of impending lockup on one or both of the monitored wheels. However, as will be seen below, the comparison involves something more than a simple fixed reference and a pure rate of drop of the average speed signal VA alone.

The decel detector comprises an op amp U2D. A simple RC differentiator is formed by a resistor R39 and a capacitor C17 connected in series from a positive potential output $V_X$ of the voltage regulator VR, to an input junction point P10. The primary input to the differentiator at junction point P10 is the average speed signal on line VA. However, another and lesser input to the differentiator at point P10 is provided by coupling of the high wheel speed signal line VH through a resistor R43 to said differentiator input point P10. The voltage applied to point P10 is primarily the average wheel speed signal (for example about 70 to 80 percent), with a substantially smaller percentage (for example 20 to 30 percent) being the high wheel speed signal from line VH, such proportions being determined by appropriate selection of resistors R23, R24 and resistor R43. Accordingly, the input to P10 may be termed a modified average wheel speed signal. The negative input of the op amp U2D receives a signal corresponding substantially to the rate of drop of such modified average wheel speed signal, from a point between capacitor C17 and resistor R39. The positive input of the op amp U2D connects intermediate the ends of a voltage divider comprising series resistors R41 and R61 connected between the voltage regulator output $V_X$ and ground. Also, the same intermediate point on the voltage divider is fed, through a resistor R40, the modified average wheel speed signal appearing at point P10. The resistor R40 is substantially larger than divider resistor R41 (for example 390 k ohm versus 4.7 k ohm). Thus the positive input of the op amp U2D carries a reference voltage which is almost constant over the range of of vehicle speeds (due to current flow through resistor R41) but which, due to the substantially smaller but speed dependent current through resistor R40 does change somewhat with speed, rendering the deceleration detector DD somewhat more sensitive at higher speeds than with resistor R40 absent. In prior systems there has been provided a substantial change in deceleration detector sensitivity over the operating speed range. In the present system, in view of the mentioned nonlinearity with speed in the output of the F/V convertors, the deceleration detector change in sensitivity with speed, while not eliminated, is reduced. The ratio of high speed sensitivity to low speed sensitivity may be further changed by varying the value of resistor R40.

The deceleration detector DD further includes a clamp circuit incorporating an operational amplifier U2C with its positive and negative inputs connected across differentiator resistor R39 as shown. A bypass resistor R49 of very high resistance (1 M ohm) is interposed between the negative inputs of operation amplifiers U2C and U2D and ground. A diode D10 connects (at its cathode) the output of op amp U2C to the negative input thereof.

The clamp circuit eliminates the need for a sophisticated differentiator circuit and permits the use of the very simple RC differentiator R39, C17. Particularly, during braking, when the monitored wheels have locked or approached locking and the brakes thereafter have been released, the wheels will roll back up toward vehicle speed at a very high rate, for example, 10 to 20 G's. Accordingly, on a high friction surface with a load differentiator R39, C17 tends during this roll up to apply very high voltage on the minus input of deceleration detector op amp U2D. Initially, however, op amp U2D would at its negative input see a drop in differentiator output voltage, as when both wheels decelerate rapidly toward a locked condition. Op amp U2D then would produce a lock signal at its output, resulting in release of the brakes, which in turn results in termination of the skid signal as wheel deceleration goes small and terminates and the wheel then rolls up toward vehicle speed. Termination of the lock signal in turn results in a reapplication of the brakes and a consequent second deceleration of the wheels toward lockup. However, the very high voltage applied by the differentiator to the op amp's negative input during roll up may not yet have cleared from the simple RC differentiator R39, C17, even as lockup approaches or occurs. In other words, the differentiator R39, C17 can go beyond desirable voltage limits during rapid roll up after an initial release of the braking force, and not be able to get back within desirable voltage limits until after reapplication of the brakes has caused the wheels to approach or achieve lockup.

This difficulty is cured, without replacement of the simple RC differentiator with a more complex and expensive one, by means of the clamp circuit. More particularly, after braking is applied and released and the wheels start to accelerate back up to vehicle speed, differentiator C17 starts to apply a rapidly growing and potentially high spike to the negative input of the deceleration detector op amp U2D, as well as to clamp operational amplifier U2C. When this voltage reaches a preselected level, namely the voltage preset on the positive input of clamp operational amplifier U2C, such operational amplifier turns on and diode D10 will conduct the current which would otherwise raise the voltage on the right hand side of the capacitor C17. The reference voltage applied to the positive input of the operational amplifier in the clamp circuit is normally relatively low, for example 2 volts. Accordingly, the clamp circuit stops the differentiator R39, C17 voltage from going beyond the reference level and accordingly allows the deceleration detector circuit to respond rapidly to reapplication of the brakes and subsequent release of braking force.

In general then the deceleration detector circuit DD responds to rapid average wheel deceleration, exceeding a reference rate, by applying a positive going lock signal from the output of the op amp U2D through a diode D11 to the lock signal line SS, such lock signal ending as wheel deceleration abates or disappears with release of the brakes.

Under certain vehicle operating conditions, such as with light vehicle loading and/or slippery road surfaces, application of the brakes may result in a very rapid wheel deceleration permitting lockup, and consequent disappearance of the deceleration signal at the negative input to deceleration detector op amp U2D, before the deceleration detector DD has had time to release or fully release the brakes, as due to time lags normally present in a hydraulic, and particularly in pneumatic, braking systems. Thus, if no further assistance is provided by other portions of the anti-lock system, the deceleration detector DD will, under such lockup conditions, terminate its lock signal, allowing reapplication of the braking forces and continuation of the lockup condition. To overcome this problem, the prior anti-lock systems above-mentioned have included some form of fixed bleed circuitry.

The present system has an improved combination fixed bleed and differential wheel speed circuit FD incorporating a comparator U1C. The positive input of the comparator connects to junction point P10 to receive the nonlinear average wheel speed signal from line VA mixed, as above, with a smaller proportion of the nonlinear high wheel speed signal supplied from line VH through resistor R43. The high wheel signal line VH additionally connects through a voltage divider comprising series resistor R45 and R47 to ground. A preselected percentage of the high wheel speed signal amplitude appears at a junction point P11 between the divider resistors. A high wheel reference circuit is interposed between the junction point P11 and the negative input of comparator U1C. The reference circuit, which provides a reference voltage for fixed bleed and differential wheel speed use, includes a capacitor C18 connected from the negative input of the comparator U1C to ground. The capacitor C18 is chargeable from the high wheel speed reference point P11 through the emitter and collector of a transistor Q14. The base of transistor Q14 connects through the anode-cathode path of a diode D13 to a DC potential output $V_Z$ of the voltage regulator VR, and, through a feedback resistor R64 to the lock signal line SS. A constant current bleed path around the capacitor C18 is provided by a transistor Q6 in series with a current limiting resistor R48, the base of transistor Q6 being connected to a constant DC voltage output $V_X$ of the voltage regulator VR. The output of the fixed bleed-DWS comparator U1C is taken through a resistor R71 to the base of an output transistor Q15. A DC output $V_C$ of the regulator VR provides emitter bias and, through a resistor R44, base bias to the transistor Q15. A lock signal generated by the fixed bleed comparator U1C is thus applied by the collector of the transistor Q15 to the lock signal line SS, providing a second source of lock signals, in addition to the deceleration detection circuit DD.

Before leaving the fixed bleed-DWS circuit FD, it may be noted that the valve driver circuit VD here comprises a transistor Q13 driven at its base by the emitter of a transistor Q12, which in turn at its base connects through a resistor R62 to the lock signal line SS. The bases of transistors Q12 and Q13 connect to ground through bias resistors R65 and R63, respectively. In this instance, a lock signal, which appears as a positive voltage on the line SS will turn on the normally nonconductive transistors Q12 and Q13.

Returning to the fixed bleed-DWS circuit FD, the transistor Q14 is normally conductive in the absence of a positive lock signal on line SS, as would be the case, for example, with the vehicle operating without braking or with moderate braking within the traction capabilities of the monitored wheels. In this condition, the transistor Q14 conducts base current from its emitter through its base and series resistors R64, R62 and R65 to ground. In the particular embodiment shown, the line SS, in the absence of a lock signal, lies close to ground, in that resistors R62 and R65 (for example 1 kohm and 4.7 kohm) are small compared to resistor R64 (for example 100 kohm). Under these conditions, the conductive transistor Q14 operates substantially at saturation with its collector substantially at the potential of its emitter, and hence at the high wheel speed reference voltage, which thereby is applied to the upper plate of capacitor C18. Thus, under known lock signal conditions, the voltage on capacitor C18, and hence on the negative input of fixed bleed comparator U1C is substantially the high wheel reference voltage, a preselected fraction of the nonlinear high wheel speed voltage on line VH. Under these conditions, of no braking or only moderate braking, the capacitor C18 tracks up and down with variations in high wheel speed, which is taken to represent vehicle speed, transistor Q14 conducting through the normally conductive transistor Q6. On the other hand, a positive skid signal on line SS, due either to actuation of the deceleration detector as above discussed, or actuation of the fixed bleed-DWS circuit as hereafter discussed, will, through resistor R64 elevate the base voltage on transistor Q14 and turn same off. Particularly, with the skid signal present, the line SS here rises to about 12 volts, sufficient to turn on diode D13, which applies about a 6 volt potential from source VZ to transistor Q14 base, turning off the transistor.

When transistor Q14 turns off, conductive constant current transistor Q6 begins to discharge reference capacitor C18. The voltage on capacitor C18, representing a preselected percentage of a hypothesized (under braking conditions) vehicle speed, gradually drops the voltage on the reference (negative) input of fixed bleed comparator U1C at a constant rate.

As above discussed, the fixed bleed mode of the circuit FD normally comes into play where, due to light vehicle loading and/or slippery road conditions, the onset of braking very rapidly decelerates the monitored wheels toward or into lockup, the deceleration detection circuit producing a lock signal only relatively briefly. This brief lock signal on line SS is sufficient to turn off transistor Q14 and through the constant current bleedoff of the voltage on capacitor C18 simulate, as a reference, a percentage of a hypothetical braked vehicle speed. However, due to the very rapid deceleration and lockup of the wheels under low friction conditions, the modified average wheel speed signal on a positive input of fixed bleed comparator U1C drops more rapidly than the speed reference voltage on capacitor C18, dropping therebelow prior to lockup, to trigger fixed bleed comparator U1C and thereby causing transistor Q15 to apply a high voltage, as a lock signal, to line SS, before the onset of wheel lockup and hence before loss of the lock signal on line SS from the deceleration detector DD. In this manner, the comparator U1C will hold a lock signal on line SS, precluding reactuation of the brakes, until such time as the monitored wheels stop decelerating, have started spin-up, and indeed have spun up to the preselected percentage of the hypothetical braked vehicle speed, i.e. until the modified average wheel speed signal appearing at point P10 and the positive input of fixed bleed comparator U1C once again moves upward past the constantly reducing reference voltage on capacitor C18. At that point, the fixed bleed comparator shuts off, no longer producing a lock signal, and in the absence of any other lock signal, the transistor Q14 will once again turn on, restoring the voltage on reference capacitor C18 to the preselected percentage of the actual high wheel voltage VH, in readiness for another cycle.

The remaining mode of operation of the circuit FD is the differential wheel speed (DWS) mode. It should be noted in connection with the above discussion of the deceleration detection circuit operation and of the fixed bleed mode of circuit FD that both monitored wheels (typically opposed on the same axle) will normally decelerate together, their speeds staying rather close together, such that the average wheel speed and high wheel speed signals on lines VA and VH are generally similar. As a practical matter, then, the presence of the resistor R43, mixing the small percentage of the high wheel speed signal from line VH with the average speed signal on line VA, makes little or no difference in deceleration detector or fixed bleed operation.

On the other hand, DWS operation of the FD circuit occurs under conditions where there is a substantial difference, during braking, in the speeds of the two monitored wheels as due to substantially different friction conditions at these two wheels (e.g. one wheel being on ice and the other on dry pavement). Accordingly, since during braking the speed of one wheel differs substantially from that of the other, the average wheel speed signal VA may differ substantially from the high wheel signal VH. In the development of the present invention, it is recognized that substantial circuit economy could be achieved by using a common circuit for both fixed bleed and DWS operation. It is desirable in DWS operation that the low speed wheel be at a very low speed, very substantially below the high speed wheel, before the DWS mode results in a lock signal and hence in a release of braking force. For example, with the high speed wheel at 20 mph, it is desired that no lock signal be triggered in DWS mode until the low speed wheel gets down to, for example, 5 mph or less. However, with the circuitry set up for satisfactory operation in fixed bleed mode, application to the positive input on the DWS-bleed comparator U1C of the unmodified average wheel speed signal, as taken direct from line VA, would result in a DWS lock signal with the low wheel speed only down to about 8 mph. In solution of this problem, the resistor R43 is provided, as mentioned, between the high wheel speed line VH and the average wheel speed line VA feeding the positive input of DWS-fixed bleed comparator U1C. Given the component values hereused for the averaging resistors R23 and R24 (2.2 kohm) and the additional resistor R43 (3.6 kohm), the result is a voltage of value corresponding to about 75 percent of the amplitude of the average wheel speed signal with about 25 percent of the average of the high wheel and low wheel speeds added thereto. Thus, for a given high wheel speed (e.g. 20 mph), the mixture of average and high wheel signals on the positive input of the DWS-bleed comparator U1C causes it to initiate a lock signal not as the low wheel speed drops to, for example, 8 mph, but rather to hold up on production of a lock signal until low wheel speed has dropped further, for example, down to 5 mph. The speeds, and for that matter component values, are given by way of example; it will be understood that same may vary within the scope of the invention. Restated, with a percentage high wheel speed voltage, appearing on capacitor C18 and on the negative (reference) input of comparator U1C, of a value satisfactory for fixed bleed operation, artifically increasing the input voltage to the positive terminal of the DWS-bleed comparator U1C (by mixing a portion of the high wheel voltage with a proportion of the average wheel speed voltage by insertion of resistor R43) desirably lowers the minimum low wheel speed required to trigger a lock signal in DWS mode.

It should be noted that operational amplifier U1C is actually arranged as a comparator with an open collector output. Normally, the positive input of comparator U1C is at a higher potential than the negative input thereof, such that the output of the comparator is normally at a high potential and the transistor Q15 is thus normally turned off. When the voltage on the positive input of the comparator drops below that on the negative input, the comparator output drops to a low potential, turning on transistor Q15 and establishing a high potential (lock signal) on line SS, indicating a DWS condition.

The valve driver VD, in addition to transistors Q12 and Q13 above mentioned, includes a transistor Q9 connected from a supply voltage outlet $V_Y$ of the regulator VR through a reverse oriented diode D25, across which the leads of the valve solenoid VS are connected, to the collector of transistor Q13 and thence to ground. A lock signal from line SS applied through a transistor Q12 turns on transistor Q13 and Q9 permitting actuation of the valve solenoid.

The valve driver circuit VD further includes the collector path of transistor Q12, which extends from an outlet $V_Y$ of the regulator VR through the base-emitter path of the transistor Q9, series resistor R60, the collector-emitter path of the output transistor Q10 of the valve driver disable circuit VDD, and a diode D22. The transistor Q10 is normally biased to conduct, i.e. not to disable the valve driver. Accordingly, a positive lock signal on line SS causes transistor Q12 to conduct through resistors R58 and R60, biased on transistor Q10, diode D22 and resistor R63 to ground. Such conduction through resistors R58, R60 and R63 biases on series transistors Q9 and Q13, which then conduct through the valve solenoid connected across diode D25, energizing such solenoid and thereby disabling the brakes associated with the monitored vehicle wheels. On the other hand, should transistor Q10 be biased nonconductive, the valve driver circuit VD will be disabled by blocking of connection through resistor R60 and transistor Q12, thereby leaving transistors Q9 and Q13 biased off.

The particular monitor circuit FS shown in FIG. 2B comprises a comparator U1D. A constant positive reference potential is supplied to the minus input of the comparator from an output $V_y$ of the voltage regulator VR. During normal system operation, the positive input of the comparator is held at a relatively low potential due to forward biasing, and hence conduction, of diode D18 along a path from the voltage regulator output VC through resistors R73 and R50, diode D18, resistors R51 and R52, the valve solenoid coil, and resistor R70 to ground. Diode D18 when conductive clamps low the positive comparator input and holds substantially discharged a capacitor C19 from its anode to ground. With a low voltage (e.g. 1½ volts) on the positive input of comparator U1D and the output $V_y$ of the voltage regulator VR coupled to the negative input of comparator U1D, the output of comparator U1D is at a low potential and thus transistor Q8 is biased on through resistor R54. Transistor Q8 conducts from the positive regulated supply pin $V_c$ through, in series, an isolating diode D23, resistors R56 and R57 and a further isolating diode D24 to ground. The resulting high potential (for example about 12 volts) on the collector of conductive transistor Q8 is applied through a resistor R55 and diode D26 to a base bias resistor R66 and hence to the base of the above-mentioned valve driver disable transistor Q10, maintaining the latter in its mentioned normally conductive condition. At the same time, the intermediate potential appearing between the resistors R56 and R57 appears at a capacitor C20 and is applied through a resistor R67 to the above-described warning unit. Capacitor C20 and resistor R67 comprise a suppression circuit for high frequency noise which may appear at the warning output terminal from an external source.

As briefly discussed below, a failure of any of the conditions monitored by the fault monitor circuit FS results in charging of capacitor C19 to the high voltage level (e.g. 6.2 volts), by blocking of diode D18, the resulting high voltage on the positive input of the comparator U1D raising its output potential to block transistor Q8 and hence block valve driver disable transistor Q10 and produce low potential on the input to the failure indicator and warning unit.

The monitor circuit here includes circuitry for fault monitoring of the four functions following.

First, a transistor Q11, termed the logic transistor, monitors operation of the lock signal producing circuitry DD and FD. By connection of its base to the voltage divider comprising resistors R68, R69, transistor Q12 and transistor Q13 connected between positive voltage source $V_c$ and ground, logic monitoring transistor Q11 is biased for conduction by conduction of transistors Q12 and Q13 to signal the presence of a lock signal. Conduction of transistor Q11 from voltage source $V_c$ raises the potential across the resistor R52, by passing current to ground through the solenoid (or if the solenoid is already energized, necessarily conducting transistor Q9 will already have applied a high potential to the rightward side of resistor R52). In view of either, the high potential at resistor R52 results in conduction through resistor R51 to charge a capacitor C21 connected to ground. Resistor R51 is relatively small (e.g. 2.2 kohm) and either of the conductive transistors Q9 and Q11 charges the capacitor C21 very rapidly to a high potential, which back biases diode D18, permitting capacitor C19 to commence charging current flow through resistors R73 and R50. Eventually (preferably after two seconds or so) the charging capacitor C19 reaches a high enough potential to switch comparator U1D as above described, from its normal condition to its fault condition, whereby transistor Q10 turns off, in turn shutting off transistors Q13 and Q9, and thus blocking further current flow through the valve solenoid and in this manner permitting re-establishment of braking force.

Lock signals, and hence the normal length of conduction of transistor Q12, are normally short compared to the charge time (for example about 2 seconds) selected for the capacitor C19 and as long as this normal operating condition prevails, transistors Q9 and Q11 will not bring on a fault sensed state in fault monitor comparator U1D. However, should the transistor Q12 and the preceding circuitry at DD and FD fail in the lock signal condition, logic transistor Q11 will cause the fault monitor FS to disable the valve driver, by turning off disable transistor Q10.

Figure 4:
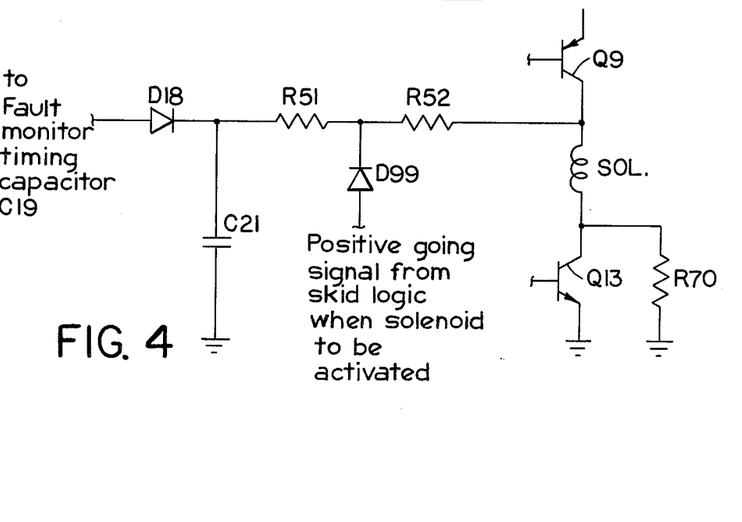
FIG. 4 discloses a further type of input to the integrator in the fault monitor circuit of FIG. 2B.

A portion of the fault monitor circuit including capacitor C21 and resistor R51, is arranged to, in effect, filter a noisy, pulsating solenoid input signal, which might not be recognized by the fault monitor circuit FS otherwise, to a recognizable signal, allowing the fault monitor timing capacitor C19 to begin timing and remain timing during this signal. More particularly, when the lock signal producing logic requests the valve solenoid be activated, transistor Q11 gets biased on as above discussed, by a drop in its base potential. If desired, as an alternate or additional mode, a corresponding potential rise can be used to forward bias a diode D99 having its cathode connected between resistors R51 and R52, as seen in FIG. 4.

Either of these inputs (conduction by transistor Q11 or conduction of diode D99) applies a voltage at the cathode of diode D18, after a slight delay caused by charging of capacitor C21 through resistor R51, of sufficient magnitude to reverse bias diode D18 and allow the timing capacitor C19 of the fault monitor circuit FS to begin timing. If the signal from the lock logic goes away, diode D18 will remain reverse biased until capacitor C21 has discharged through resistors R51, R52, R70 and the valve solenoid to allow diode D18 to become forward biased, thus allowing the timer circuit (incorporating capacitor C19) to reset. The integrator C21, R51 recognizes a lock signal quickly (i.e. the time constant of resistor R51 and capacitor C21 is small) but delays recognition of an "off solenoid" condition for a longer time due to the slower discharge rate of capacitor C21 through R51, R52, R70 and the valve solenoid. The resistors are then sized appropriately for the type of noisy solenoid input signal to be detected. In one embodiment, values used were: R51=2.2 kohm, R52=47 kohm, R70=1 kohm, and C21=0.22 uf.

Fault monitor FS also monitors solenoid continuity. In the absence of a conductive path through the solenoid for current flow through resistor R59, the solenoid, and resistor R70 to ground, a high voltage appears at the bottom of resistor R59. Once again, this back biases diode D18 and if the condition persists long enough (e.g. 2 seconds) capacitor C19 has opportunity to charge up to a sufficiently high level as to switch comparator U1D to fault sensed state so as to disable the valve driver circuit VD and provide a warning through resistor R67 to the failure indicator and warning unit.

The third function monitored by the fault monitor FS is whether output from the regulated voltage supply VR is sufficiently high for proper circuit operation. Particularly, a circuit comprising a resistor R2, a zener diode D3 and a resistor R7 is connected across the output $V_c$ of the regulator VR to ground.

A transistor Q2 has its collector connected through a load resistor R6 to the voltage supply $V_c$ and in its emitter-base circuit contains the resistor R7. In the particular embodiment shown, transistor Q2 requires about 100 micro-amps to maintain conduction and this will be supplied if the regulating diode D3 is drawing a minimal amount of current, as thus it is intended to do. If the regulating diode D3 supplies less than this minimal (100 micro-amp, for example) current, the voltage across resistor R7 drops to less than required to provide conduction of transistor Q2, which thus turns off. The collector voltage of transistor Q2 thus rises substantially, toward the supply voltage VC and, accordingly, a diode D17 rapidly charges the timing capacitor C19 from the high voltage collector of nonconductive transistor Q2. In this instance, a defective regulated voltage supply VR results in substantially an immediate fault sensed state and disabling of the valve driver, and hence restoration of normal braking.

In addition to the above-referenced functions, the fault monitor FS includes one further one by which it detects a failure in the frequency to voltage conversion circuitry FV, resulting in a continuous high voltage output therefrom, i.e. a F/V fail high condition. To this end, an extension VH' of the high wheel speed line from the output of transistor Q5 goes to the emitter of a transistor Q7. Where for example the line VH' in an F/V fail high condition registers about 12 volts, the base of transistor Q7 connects to a lesser voltage source, for example at about 6 volts, here furnished by an output $V_c$ of the voltage regulator VR. The base-collector circuit of the transistor Q7 is through a resistor R50, the diode D18 and a further diode D19. Thus, with a fail-high condition, a higher voltage on the emitter of transistor Q7 than on the base of transistor Q7 turns same on, and causes diode D19 to conduct and once again back bias the diode D18, permitting the capacitor C19 to once again charge up and in due time (e.g. 2 seconds) switch the monitor comparator U1D to disable the valve driver VD. The F/V convertors are such that if a failure condition occurs, it is likely to be a fail-high condition and the fault monitor immediately above described recognizes and provides protection against the possibility of such a failure.

MODIFICATION

Figure 5:
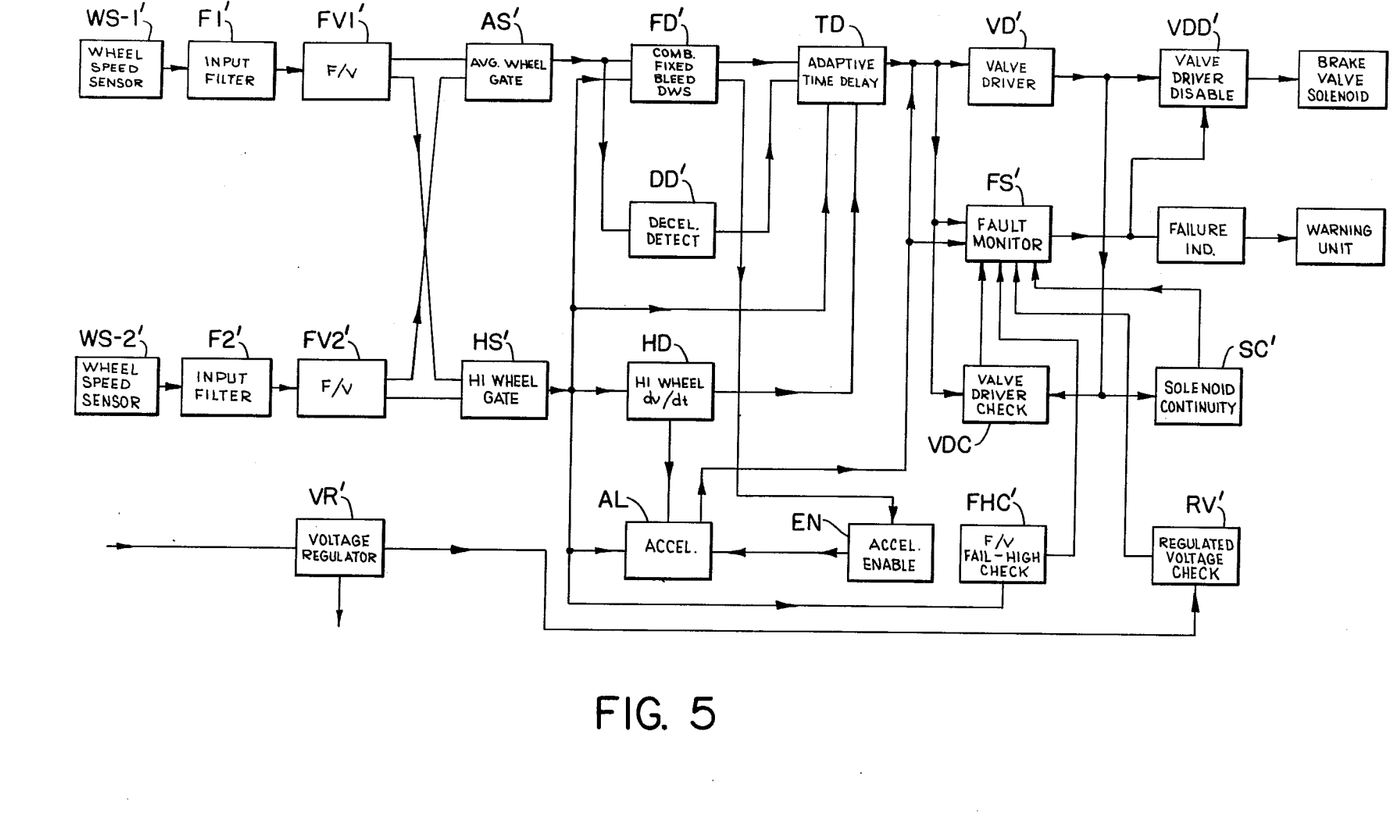
FIG. 5 is a block diagram of a modified anti-wheel lock system incorporating functions in addition to those of FIG. 1.

FIG. 5 discloses a further embodiment of the invention similar to that of FIG. 1 except for the addition of several subcircuits not found in the basic FIG. 1 antilock system. Portions of the FIG. 5 embodiment which may be similar to corresponding parts of the FIG. 1 embodiment carry similar reference characters, but "primed."

The added subcircuitry includes an adaptive time delay circuit TD, a high wheel speed differentiator HD, a high wheel acceleration sensing circuit AL, and an enabling circuit EN for the latter. The detailed circuitry of units TD, HD, AL and EN may, if desired, be generally similar to correspondingly referenced units of aforementioned U.S. Pat. No. 3,929,382 assigned to the assignee of the present invention. Preferably, the unit HD responds to the high wheel speed signal at the output of high wheel gate HS' and applies a signal representing the time rate of change thereof (acceleration or deceleration of the higher speed wheel) to the adaptive time delay unit TD and the acceleration unit AL. The adaptive time delay unit TD preferably delays application of skid signals from the DWS and deceleration units FD' and DD', to the valve driver VD', at relatively low high speed wheel deceleration rates (e.g. about a ½ second delay for about 0 or 0.1 G high wheel deceleration) but reduces this delay substantially to 0 for greater decelerations of the high speed wheel, for example about ½ G. Preferably no time delay is provided when the high speed wheel is actually accelerating.

The acceleration logic circuit AL receives the rate of change of high wheel speed signal from the high wheel speed differentiator HD and, if enabled, will provide a positive lock signal only when the acceleration level of the high speed wheel exceeds a reference, for example 0.3 G. If the acceleration logic AL produces such a lock signal, the latter is applied to the valve driver VD' directly, and if desired, lock signal output line of acceleration logic AL may be monitored by the fault monitor FS' just as the latter monitors other lock signal inputs to the valve driver.

The acceleration enable unit EN prevents generation of a lock signal by the acceleration unit except when a lock signal has already been initiated by another unit, here the DWS output of unit FD' or the fixed bleed output thereof.

The acceleration logic AL may also be provided with the high wheel speed signal from gate S' to inhibit output of a skid signal from the acceleration logic AL should the high wheel acceleration exceed particular speed dependent levels, 3. g. exceed 1.0 G at 25 mph or 2.0 G at 10 mph.

The FIG. 5 system goes beyond the system of FIG. 1 and of the aforementioned U.S. patents, in providing a valve driver check circuit VDC connected to compare the input signal to the valve driver VD' with the output signal therefrom, to determine that the valve driver is operating properly. In the event that such valve driver input and output signals fail to compare, the valve driver check circuit VDC triggers the monitor circuit FS', which then through the failure indicator and warning unit, warns the vehicle operator of the malfunction.

Figure 6:
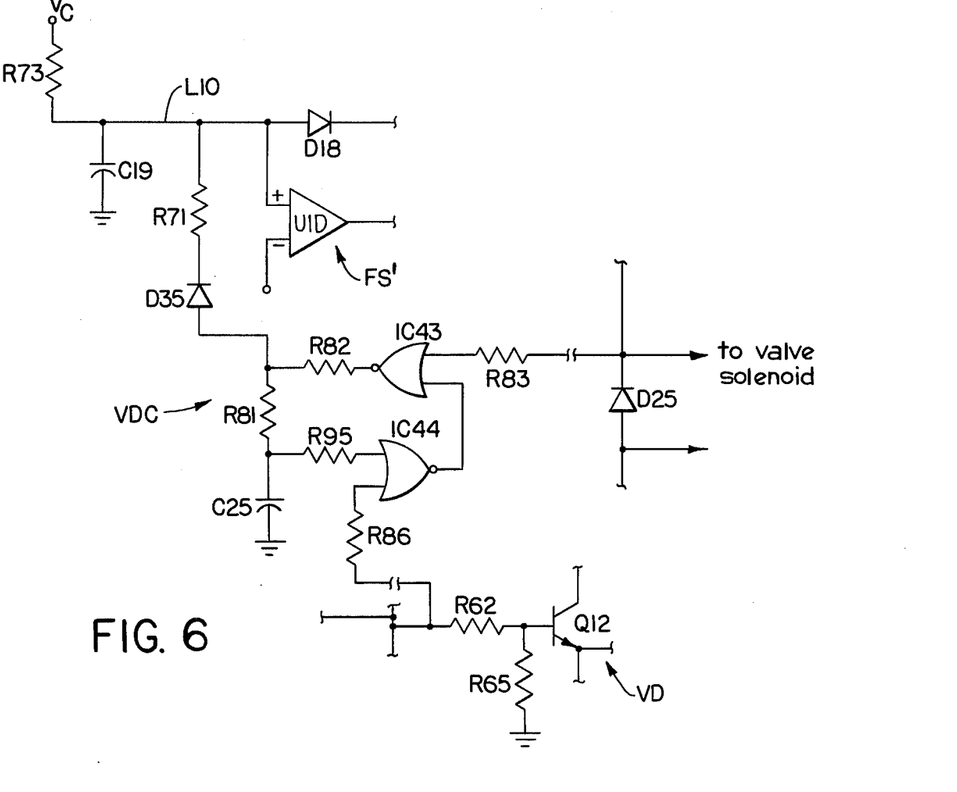
FIG. 6 is a schematic diagram of a portion of the FIG. 5 system, particularly disclosing a valve driver check circuit.

FIG. 6 discloses an embodiment of the valve driver check circuit VDC and its connections to a fragmentary representation of the antilock braking circuit, as of FIGS. 1 and 2. The valve driver check circuit comprises NOR gates IC43 and IC44. The input side of the valve driver circuit is monitored by connection of one input of NOR gate IC44 through a resistor R86, here to the junction point at which lock signals from line SS are applied to resistor R62 to energize the valve driver input transistor Q12. The output side of the valve driver is here monitored by connecting an input of the NOR gate IC43 through a resistor R83 to the upper side of the valve solenoid (and hence the cathode of diode D25 as shown). The output connection of the valve driver check circuit, to the fault monitor FS', is from the output of NOR IC 43 through a series resistor R82 connected, on the one hand, through a diode D35 and resistor R71 to the monitor input line L10, to which above-described capacitor C19, diode D18 and comparator U1D of the fault monitor circuit connect. The output resistor R82 also connects through a further resistor R81 and a small series noise reduction capacitor C25 to ground. The remaining input of NOR gate IC44 connects through a resistor R95 to such capacitor.

Given a positive-going lock signal on line SS, the valve driver VD' should apply a high positive voltage to the upper end of diode D25 to energize the valve solenoid. Given a positive lock signal applied through resistor R86 to NOR IC44, the latter produces a low or logic 0 output, regardless of the potential applied through its remaining input resistor R95. This conditions remaining NOR gate IC43 to provide a low output where the properly operating valve driver applies a high voltage through its remaining input resistor R83. As a result, monitor input line L10 is not affected and the valve driver check circuit does not cause the fault monitor to issue a fault signal. On the other hand, if the energized valve driver circuit VD fails to apply the usual high voltage to the valve solenoid, such that the resistor R83 applies a low potential to its input of NOR IC43, such NOR switches to a high output potential, which is applied through resistors R82, R81 and R95 to the second input of IC44 to set the output of IC44 low and thus latch the output of IC43 high which is then applied through diode D35 and resistor R71 to line L10 to energize capacitor C19 and hence the monitor comparator U1D.

Although preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel lock control system for use with a vehicle having at least first and second spaced apart independently rotatable wheels and having a braking system for applying braking forces to said wheels, comprising:

means responsive to an applied lock signal for controlling the braking system to relieve the braking forces on said wheels;

means for providing wheel speed signals of values nonlinearly representative of the wheel speeds of corresponding ones of said wheels, such that for a given change in wheel speed there is a greater change in speed signal at low wheel speeds than at high wheel speeds, said means for providing a wheel speed signal comprising means for supplying a frequency signal of frequency proportional to the speed of the corresponding one of said wheels, a nonlinear frequency to voltage convertor comprising an operational amplifier, a voltage divider connected between the output of said frequency signal means and input of said operational amplifier for setting a voltage level to which said frequency signal may swing, means responsive to said frequency and to said voltage set by said voltage divider, in combination, for coupling said voltage divider to the input of said operational amplifier and thereby for causing said operational amplifier to produce an output amplitude related to said frequency and to said voltage, and nonlinear means responsive to the output amplitude of said operational amplifier and connected to said voltage divider for changing said voltage to which said frequency signal can swing when the output of said operational amplifier passes between a first amplitude range and an adjacent second amplitude range;

logic circuit means for providing a lock signal, said logic circuit means including comparator circuit means responsive to said nonlinear wheel speed signals for producing a said lock signal.

2. The system of claim 1, in which said voltage divider comprises first and second resistors in series between a potential source and the output of said frequency signal means, the input of said operational amplifier being coupled to the junction point between said resistors, said nonlinear means comprising a series diode and resistor connected from the output of said operational amplifier to said junction point.

3. A wheel lock control system for use with a vehicle having at least first and second spaced apart independently rotatable wheels and having a braking system for applying braking forces to said wheels, comprising:

means responsive to an applied lock signal for controlling the braking system to relieve the braking forces on said wheels;

means for providing first and second wheel speed signals of values nonlinearly representative of the wheel speeds of corresponding ones of said wheels, such that for a given change in wheel speed there is a greater change in speed signal at low wheel speeds than at high wheel speeds;

logic circuit means for providing a lock signal, said logic circuit means including fixed bleed means for providing a said lock signal when a said nonlinear wheel speed signal applied to said fixed bleed means drops faster than a decreasing reference signal, said fixed bleed means including means for providing as said applied speed signal a nonlinear high wheel speed signal from the larger of said wheel speed signals, said fixed bleed means including a reference signal source comprising a chargeable means connected for charging by said nonlinear wheel speed signal in the absence of a lock signal, a first electronic switch normally conductive for charging said chargeable means with said nonlinear high wheel speed signal, and means conductive at a constant current through said source for otherwise decreasing said reference signal linearly with respect to time in the presence of a said lock signal, wherein said nonlinearity in said wheel speed signals compensates for said linearity in decreasing of said fixed bleed reference signal, said constant current means comprising a second electronic switch for discharging said chargeable means at a fixed discharge rate and cooperative with said first electronic switch such that in the absence of a lock signal said chargeable means provides a bleed signal in fixed linear relation to the speed signal of the faster of said wheels, comparator means responsive to a drop in the average of said wheel speed signals below said fixed bleed signal for producing a said lock signal, and means responsive to a lock signal for shutting off said first electronic switch.

4. A wheel lock control system for use with a vehicle having at least first and second spaced apart independently rotatable wheels and having a braking system for applying braking forces to said wheels, comprising:

means responsive to an applied lock signal for controlling the braking system to relieve the braking forces on said wheels;

means for providing wheel speed signals of values nonlinearly representative of the wheel speeds of corresponding ones of said wheels, such that for a given change in wheel speed there is a greater change in speed signal at low wheel speeds than at high wheel speeds;

logic circuit means for providing a lock signal, said logic circuit means including comparator circuit means responsive to said nonlinear wheel speed signals for producing a said lock signal;

a fault monitor means actuable for disabling said lock signal responsive means to leave relieved the braking forces on said wheels despite the presence of a lock signal, said fault monitor means including timing means responsive to continuing actuation of said braking force relieving means for timing a maximum permitted interval of braking force relief, and means responsive to timing out of said timing means for disabling of said braking force relieving means to permit reapplication of braking force by the braking system, and integrator means connected to said timing means for permitting continued timing thereby during said interval despite a momentary interruption in the actuation of said braking force relieving means.

5. The system of claim 4, including a fault monitor means actuable for disabling said lock signal responsive means so as to leave unrelieved the braking forces on said wheels despite the presence of a lock signal, and means responsive to increase in the higher of the wheel speed signals to beyond a preselected value for actuating said fault monitor means.

6. A wheel lock control system for use with a vehicle having at least first and second spaced apart independently rotatable wheels and having a braking system for applying braking forces to said wheels, comprising:
    means responsive to an applied lock signal for controlling the braking system to relieve the braking forces on said wheels;
    means for providing first and second wheel speed signals of values nonlinearly representative of the wheel speeds of corresponding ones of said wheels, such that for a given change in wheel speed there is a greater change in speed signal at low wheel speeds than at high wheel speeds;
    logic circuit means for providing a lock signal, said logic circuit means including a deceleration detector circuit means for providing a lock signal when a differentiated wheel speed signal exceeds a reference signal;
    said logic circuit means including fixed bleed means for providing a said lock signal when a said nonlinear wheel speed signal applied to said fixed bleed means drops faster than a decreasing reference signal, said fixed bleed means including a capacitor as a reference signal source connected for charging by said nonlinear wheel speed signal in the absence of a lock signal, and means conductive at a constant current through said source for otherwise decreasing said reference signal linearly with respect to time in the presence of a said lock signal, wherein said nonlinearity in said wheel speed signals compensates for said linearity in decreasing of said fixed bleed reference signal, a constant current electronic switch connected across said capacitor as said constant current conductive means, a further electronic switch connected between a wheel speed signal source and said capacitor for charging said capacitor, said further electronic switch having a control electrode normally biased for maintaining said charging of said capacitor, said control electrode being connected to the lock signal outputs of said fixed bleed means and said deceleration detector means and being responsive to a lock signal from any of said outputs for shutting off said further electronic switch.

7. A wheel lock control system for use with a vehicle having at least first and second spaced apart independently rotatable wheels and having a braking system for applying braking forces to said wheels, comprising:
    means responsive to an applied lock signal for controlling the braking system to relieve the braking forces on said wheels;
    means for providing wheel speed signals of values nonlinearly representative of the wheel speeds of corresponding ones of said wheels, such that for a given change in wheel speed there is a greater change in speed signal at low wheel speeds than at high wheel speeds;
    logic circuit means for providing a lock signal in response to said nonlinear wheel speed signals, said logic circuit means including a deceleration detector having a comparator means, means providing an average wheel speed signal from said first mentioned wheel speed signals and representing the average speed of said wheels, means providing a high wheel speed signal from said first mentioned wheel speed signals and representing the speed of the faster rotating one of said wheels, means providing a modified average wheel speed signal from said average and high wheel speed signals, means for differentiating said modified average wheel speed signal and applying the resulting differential signal to said comparator means, and means including a fixed voltage source and means provided with a modified average wheel speed signal for combined connection to said reference input terminal of said comparator means.

8. The system of claim 7, in which said comparator means has a deceleration input terminal to which said differential signal is applied, said differentiating means including a capacitor connecting said modified average wheel speed signal to said deceleration input terminal of said comparator means and a resistor connecting from a fixed potential source to a point between said capacitor and deceleration input terminal, so as to provide an RC differentiator;
    a clamp circuit including an operational amplifier having input terminals connected across said differentiator resistor, a high resistance bypass resistor interposed between the deceleration input terminal of said comparator means and the adjacent input terminal of said operational amplifier, on one side thereof, and on the other side thereof to circuit ground, and a diode connecting the output of said operational amplifier to the ungrounded end of said bypass resistor whereby said clamp circuit stops the voltage of said RC differentiator from going beyond a predetermined limit during high speed roll up of the vehicle wheels, so as to permit said deceleration comparator means to respond rapidly to reapplication of the brakes and subsequent release of braking force.

9. A wheel lock control system for use with a vehicle having at least first and second spaced apart independently rotatable wheels and having a braking system for applying braking forces to said wheels, comprising:
    means responsive to an applied lock signal for controlling the braking system to relieve the braking forces on said wheels;
    means for providing wheel speed signals of values nonlinearly representative of the wheel speeds of corresponding ones of said wheels, such that for a given change in wheel speed there is a greater change in speed signal at low wheel speeds than at high wheel speeds;

logic circuit means for providing a lock signal, said logic circuit means including comparator circuit means responsive to said nonlinear wheel speed signals for producing a said lock signal;

said means responsive to an applied lock signal including means for relieving the braking forces on said wheel and valve driver means responsive to a said lock signal from said logic circuit means for triggering said brake force relieving means;

valve driver check means for signaling when a lock signal applied to said valve driver means fails to cause the latter to trigger said brake force relieving means, said valve driver check means including comparing means for comparing the input signal to said valve driver means with the output signal from said valve driver means for carrying out said signaling when said valve driver input and output signals fail to compare, said comparing means comprising first and second NOR gates, said first NOR gate having inputs connected respectively to the output side of said valve driver means and to the output of said second NOR gate, voltage dropping means connecting the output of said first NOR gate to an input of said second NOR gate, means connecting the input of said valve driver means to the remaining input of said second NOR gate, said failure of said valve driver means to respond to energization of its input by correspondingly energizing its output causing said first NOR gate to initiate said signaling of said failure and causing said second NOR gate to latch said first NOR gate in such signaling condition, and fault monitor means responsive to a said signal from said valve driver check means for signaling a failure in said system.

* * * * *

UNITED STATES PATENT OFFICE
CERTIFICATE OF CORRECTION

Patent No. 4 168 866      Dated September 25, 1979

Inventor(s) Joseph H. McNinch, Jr. et al

It is certified that error appears in the above-identified patent and that said Letters Patent are hereby corrected as shown below:

In the introductory information on the first page, under the heading "Inventors"; the name "Klein" should be ---Klien---.

Col. 10, line 21; change "1 kohm" to ---1 k ohm---.

Col. 10, line 22; change "4.7 kohm" to ---4.7 k ohm---.

Col. 10, line 23; change "100 kohm" to ---100 k ohm---.

Col. 10, line 38; change "skid" to ---lock---.

Col. 10, line 43; change "skid" to ---lock---.

Col. 11, line 67; change "2.2 kohm" to ---2.2 k ohm---.

Col. 11, line 68; change "3.6 kohm" to ---3.6 k ohm---.

Col. 12, line 38; change "$V_Y$" to ---$V_y$---.

Col. 12, line 47; change "$V_Y$" t9 ---$V_y$---.

Col. 13, line 60; change "kohm" to ---k ohm---.

Col. 14, line 50; change "kohm" to ---k ohm---.

Col. 14, line 51; change "kohm" to ---k ohm--- (both occurrences).

Col. 19, line 4; change "relieved" to ---unrelieved---.

UNITED STATES PATENT OFFICE
CERTIFICATE OF CORRECTION

Patent No. 4,168,866          Dated September 25, 1979

Inventor(s) Joseph H. McNinch, Jr. et al

It is certified that error appears in the above-identified patent and that said Letters Patent are hereby corrected as shown below:

Col. 20, line 30; change "a" to ---said---.

Col. 20, line 31; change "said" to ---a---.

Signed and Sealed this

Nineteenth Day of February 1980

[SEAL]

Attest:

SIDNEY A. DIAMOND

Attesting Officer      Commissioner of Patents and Trademarks